(12) United States Patent
Takasaki et al.

(10) Patent No.: US 9,312,735 B2
(45) Date of Patent: Apr. 12, 2016

(54) STATOR AND ROTARY ELECTRIC MACHINE

(71) Applicants: Akira Takasaki, Toyota (JP); Akihito Koike, Anjo (JP)

(72) Inventors: Akira Takasaki, Toyota (JP); Akihito Koike, Anjo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 42 days.

(21) Appl. No.: 13/659,052

(22) Filed: Oct. 24, 2012

(65) Prior Publication Data

US 2013/0099620 A1    Apr. 25, 2013

(30) Foreign Application Priority Data

Oct. 25, 2011 (JP) ................................. 2011-234323

(51) Int. Cl.
*H02K 3/50* (2006.01)
*H02K 3/38* (2006.01)
*H02K 15/00* (2006.01)

(52) U.S. Cl.
CPC .................. *H02K 3/505* (2013.01); *H02K 3/38* (2013.01); *H02K 3/50* (2013.01); *H02K 15/0056* (2013.01); *H02K 15/0081* (2013.01)

(58) Field of Classification Search
CPC ............. H02K 3/12; H02K 3/50; H02K 3/28; H02K 15/0081
USPC ................................. 310/179, 260, 201–208
See application file for complete search history.

(56) References Cited

U.S. PATENT DOCUMENTS

| 6,147,432 | A  |   | 11/2000 | Kusase et al. |
| 6,191,508 | B1 | * | 2/2001  | Aoki et al. ...................... 310/45 |
| 6,841,913 | B2 | * | 1/2005  | Gorohata et al. ............. 310/180 |
| 2001/0026109 | A1 | * | 10/2001 | Higashino et al. ............ 310/201 |
| 2004/0145257 | A1 | * | 7/2004  | Oohashi .......................... 310/71 |
| 2010/0148620 | A1 |   | 6/2010  | Ishizuka et al. |
| 2011/0012450 | A1 | * | 1/2011  | Umeda et al. ................... 310/71 |
| 2011/0198953 | A1 | * | 8/2011  | Shinohara et al. .............. 310/71 |

FOREIGN PATENT DOCUMENTS

| CN | 1518190     | 8/2004 |
| JP | 2000-60051  | 2/2000 |
| JP | 2010-166803 | 7/2010 |
| JP | 2012-115015 | 6/2012 |
| JP | 2013-5516   | 1/2013 |

* cited by examiner

*Primary Examiner* — Dang Le
*Assistant Examiner* — Leda Pham
(74) *Attorney, Agent, or Firm* — Finnegan, Henderson, Farabow, Garrett & Dunner, LLP

(57) ABSTRACT

A stator includes a core fixed to a case of a rotary electric machine, and a plurality of winding wire coils that are wound on the core and that form a coil end protruded in the axial direction of the core. The two winding wire coils have a first and second conducting wires that are exposed in a distal end of each of the two coils. The stator includes: a joint in which the first and second wires are joined together at the coil end and in which proximal portions of the two coils approach each other with an acute angle therebetween so that the first and second wires lie on each other; and an insulating coat formed to enclose the joint with an insulating material that is coated entirely over peripheries of the two coils in their circumferential directions while filling a space across which the proximal portions form the acute angle. A rotary electric machine includes the stator, the case and a rotor.

9 Claims, 3 Drawing Sheets

STATOR AND ROTARY ELECTRIC MACHINE

INCORPORATION BY REFERENCE

The disclosure of Japanese Patent Application No. 2011-234323 filed on Oct. 25, 2011 including the specification, drawings and abstract is incorporated herein by reference in its entirety.

BACKGROUND OF THE INVENTION

1. Field of the Invention

The invention relates to a stator for a rotary electric machine and a rotary electric machine. More particularly, the invention relates to a stator and a rotary electric machine in which a joint portion where end portions of winding wire coils are joined is provided at a coil end.

2. Description of Related Art

The stator of a rotary electric machine has a construction in which winding wire coils are wound on a stator core. Portions where the wound winding wire coils are protruded in the axis direction of the stator core are termed coil ends. In many constructions, a plurality of winding wire coils are connected to each other at such a coil end.

For example, Japanese Patent Application Publication No. 2010-166803 (JP 2010-166803 A) shows how, at a coil end, end portions of winding wire coils are protruded in the axis direction of the stator.

In the case where end portions of winding wire coils are interconnected by joining at a coil end of a rotary electric machine stator, it is necessary to secure electrical insulation between the joint portions and a rotary electric machine case. To that end, for example, a resin coating is provided on the joint portions.

However, in the case where the joint portions are provided with a resin coating, there is possibility that the resin coating may fall away from the joint portions due to vibration or heating cycles, depending on the adhesion force of the resin coating. The fall-away of the coating from the joint portions due to heating cycles can possibly occur due to different thermal expansion coefficients of the conductor wires in the joint portions and the resin coating for electrical insulation which are obviously made of different materials.

SUMMARY OF THE INVENTION

The invention provides a stator for a rotary electric machine and a rotary electric machine that are capable of more certainly preventing the insulative coating from falling away from the joint portions of winding wire coils.

A stator for a rotary electric machine in accordance with a first aspect of the invention includes a stator core fixed to a case of the rotary electric machine, and a plurality of winding wire coils including conducting wires and an insulating cover. The conducting wires are each covered with the insulating cover. The winding wire coils are wound on the stator core and form a coil end protruded in an axial direction of the stator core. The winding wire coils include predetermined two winding wire coils. One winding wire coil of the two winding wire coils includes a first conducting wire that is exposed by removing the insulating cover from a distal end portion of the one winding wire coil. The other winding wire coil of the two winding wire coils includes a second conducting wire that is exposed by removing the insulating cover from a distal end portion of the other winding wire coil. The stator in accordance with the first aspect of the invention further includes: a joint in which the first conducting wire and the second conducting wire are joined together at the coil end and in which a proximal portion of the one winding wire coil and a proximal portion of the other winding wire coil approach each other with an acute angle between the proximal portion of the one winding wire coil and the proximal portion of the other winding wire coil so that the first conducting wire and the second conducting wire lie on each other; and an insulating coat formed to enclose the joint with an insulating material. The insulating material is coated entirely over a periphery of the one winding wire coil in a circumferential direction of the one winding wire coil and entirely over a periphery of the other winding wire coil in a circumferential direction of the other winding wire coil while filling a space across which the proximal portions of the two winding wire coils in the joint form the acute angle.

In the stator in accordance with the first aspect of the invention, the insulating coat may enclose wholly the joint in a range of a predetermined distance from a surface of an inner wall of the case.

Furthermore, in the stator in accordance with the first aspect of the invention, the insulating coat may be formed by painting with a resin powder.

Due to the foregoing construction, the stator includes the insulating coat that is formed so as to enclose the joint of winding wire coils at the coil end and that is formed by coating an insulating material so that the material extends entirely over the periphery of the one winding wire coil in its circumferential direction and entirely over the periphery of the other winding wire coil in its circumferential direction while filling the space across which the proximal portions of the two winding wire coils in the joint portion form an acute angle.

Thus, by providing the insulating coat so that the insulating coat encloses the joint over the entire peripheries of the two winding wire coils in their circumferential directions while filling the space across which the proximal portions of the two winding wire coils form an acute angle, the insulating coat is physically and mechanically firmly secured around the two winding wire coils. This physical or mechanical securing force is added to the adhesion force between the insulating coat and the two winding wire coils, so that the insulating coat can be more certainly prevented from falling away from the joint of the winding wire coils.

Furthermore, in the stator, the insulating coat encloses the whole joint in the range of the predetermined distance from the surface of the inner wall of the case, By making the distance suitable for the insulating performance demanded on the rotary electric machine, the insulation between the joint of the winding wire coils and the case can be more certainly secured.

Furthermore, in the stator, the insulating coat is formed by painting with resin powder. With regard to the resin powder painting according to the related art, by performing the painting so that the painted resin powder encloses the joint entirely over the peripheries of the two winding wire coils in their circumferential directions while filling the space across which the proximal portions of the two winding wire coils form an acute angle, it is possible to more certainly prevent the insulating coat from falling away from the joint of the winding wire coils.

A rotary electric machine in accordance with a second aspect of the invention includes the above-described stator, the case to which the stator is fixed, and a rotor including a magnet.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
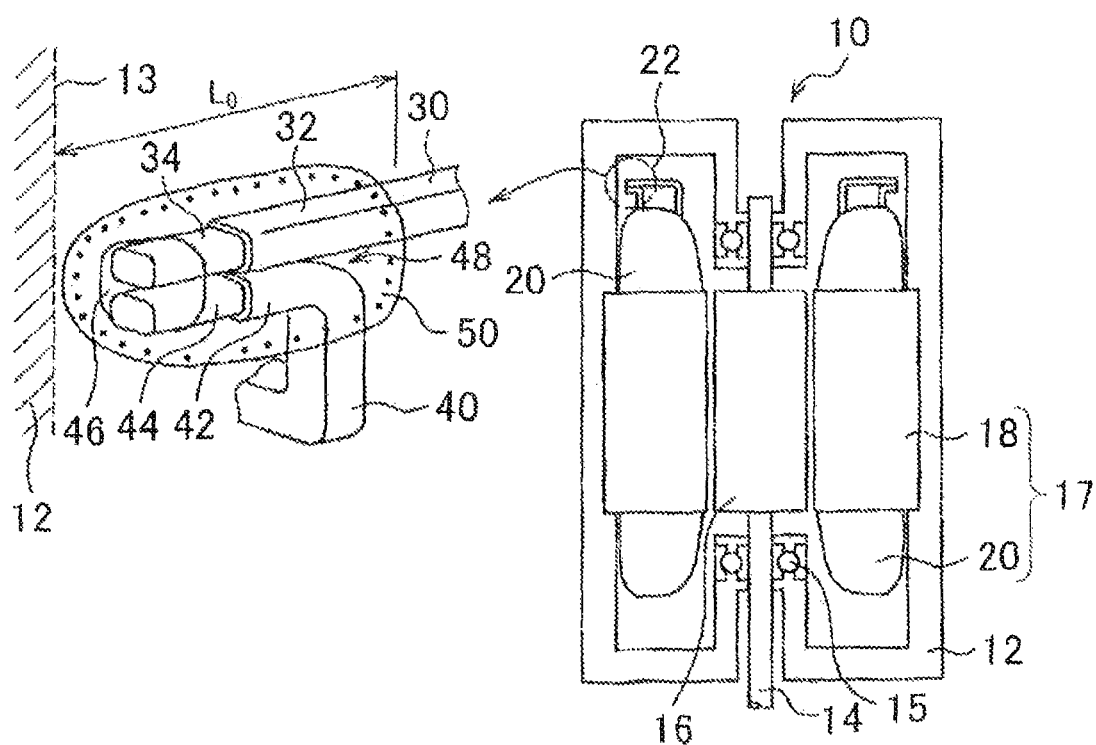
FIG. 1 is a diagram showing a construction of a rotary electric machine that uses a rotary electric machine stator in accordance with an embodiment of the invention, and details of a joint portion at a coil end.

Embodiments of the invention will be described in detail hereinafter with reference to the drawings. Hereinafter, the rotor core of the rotary electric machine will be described as being one that is formed by stacking magnetic steel sheets and that is provided with permanent magnets contained therein. However, this is merely illustrative. The rotor core may also be one in which permanent magnets are disposed on a surface of the magnetic steel sheets, or may also be a reluctance type core that does not use a permanent magnet. The rotor core may also be one that is formed by stacking core pieces other than magnetic steel sheets, or may also be a unitary type core. Similarly, although the stator core of the rotary electric machine will be described as being one that is formed by stacking magnetic steel sheets, the stator core may instead be one that is formed by stacking core pieces other than magnetic steel sheets, or may also be a unitary type stator core.

While four concrete structural examples in which two winding wire coils are joined will be described below, there may also be adopted any modification of the four concrete structural examples as long as there is a need to secure electrical insulation between a rotary electric machine case body (case) and the joint portion (joint).

In the description below, the same or comparable elements in all the drawings are denoted by the same reference characters, and redundant descriptions thereof are omitted. Besides, in the description below, the same reference characters will be repeatedly used for the same or comparable elements.

FIG. 1 is a diagram showing a construction of a rotary electric machine that includes a rotary electric machine stator (stator) 17 that has coil ends 20. The rotary electric machine 10 includes a rotary electric machine case body 12, a rotating shaft 14 supported freely rotatably on the rotary electric machine case body 12, a rotary electric machine rotor (rotor) 16 attached to the rotating shaft 14, and a rotary electric machine stator 17.

The rotary electric machine case body 12 is a casing for the whole rotary electric machine 10, and is made of metal. The rotary electric machine case body 12 houses therein the rotary electric machine rotor 16 and the rotary electric machine stator 17, and therefore has a shape that extends along outer peripheries of these components housed inside.

In the example shown in FIG. 1, since the rotary electric machine stator 17 is provided with the coil ends 20 that are protruded in the axis direction, the inner wall shape of the rotary electric machine case body 12 is set so that appropriate clearance spaces are provided between the rotary electric machine case body 12 and the coil ends 20. Furthermore, since the rotary electric machine rotor 16 is provided with the rotating shaft 14 that extends along the center axis of the rotor 16 and two ends of the rotating shaft 14 are supported by bearings 15, the shape of the rotary electric machine case body 12 is set so as to extend to the locations of the bearings 15 at the two ends of the rotary electric machine rotor 16. It is to be noted herein that the shape of the rotary electric machine case body 12 shown in FIG. 1 is merely an example, and can be other than the shape of this example.

The rotary electric machine rotor 16 is formed by disposing permanent magnets in a rotor core made by stacking magnetic steel sheets. The rotary electric machine rotor 16 is attached to the rotating shaft 14, and the two ends of the rotating shaft 14 are supported by the bearings 15. Due to the cooperation of the permanent magnets of the rotary electric machine rotor 16 and the rotating magnetic fields created by electrifying the winding wire coils of the rotary electric machine stator 17, drive force that rotates the rotary electric machine rotor 16 relative to the rotary electric machine stator 17 is produced, so that the rotary electric machine 10 rotates, that is, operates.

The rotary electric machine stator 17 includes a stator core 18 made by stacking a plurality of magnetic steel sheets, and a plurality of winding wire coils that are wound on a stator core 18. FIG. 1 shows the coil ends 20 that are portions where portions of a plurality of winding wire coils are protruded from two ends of the stator core 18 in its axis direction.

Figure 2:
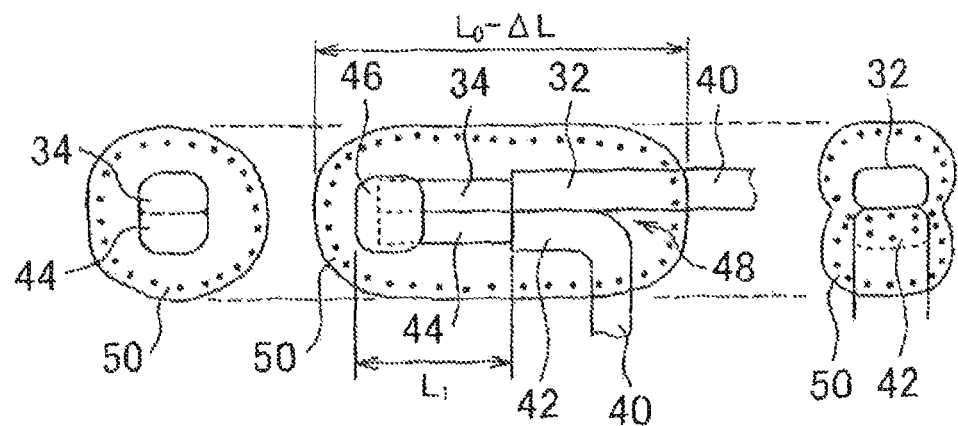
FIG. 2 is a three-view diagram of the joint portion shown in FIG. 1.

At the coil ends 20 there are provided a joint portion 22 of two winding wire coils that are determined beforehand to be joined together, among a plurality of winding wire coils. FIG. 1 shows an enlarged detailed view of a joint portion 22. FIG. 2 is a three-view diagram of a joint portion 22.

In each joint portion 22, one conducting wire (first conducting wire) 34 exposed by removing an insulating cover 32 from a distal end portion (a distal end of an end portion) of one winding wire coil 30 of two winding wire coils 30 and the other conducting wire (second conducting wire) 44 exposed by removing an insulating cover 42 from a distal end portion (a distal end of an end portion) of the other winding wire coil 40 are joined together. For the joining, a laser welding technique or the like can be used, whereby a weld ball 46 is formed by the melting and fusing of the one conducting wire 34 and the other conducting wire 44.

In order to form the weld ball 46, it is necessary to cause the one conducting wire 34 and the other conducting, wire 44 to overlap each other. To that end, a proximal portion of the one winding wire coil 30 and a proximal portion of the other winding wire coil 40 are shaped so as to approach each other with an acute angle formed therebetween. In FIG. 1, a wedge-shaped space 48 is a space across which the proximal portions of the two winding wire coils 30 and 40 form an acute angle therebetween. The proximal portions of the two winding wire coils 30 and 40 are adjacent to the distal ends of the winding wire coils 30 and 40, respectively.

An insulation coating portion (insulating coat) 50 of the joint portion 22 is an insulting body formed by coating peripheries of the one conducting wire 34 and the other conducting wire 44 with a resin powder that is an insulating material. The resin powder for use herein may be, for example, an epoxy resin powder, and the coating method may be a painting technique. The insulation coating portion 50 is formed by coating the joint portion 22 with the resin powder so that the resin powder mass extends over the entire periphery of the one winding wire coil 30 in its circumferential direction and over the entire periphery of the other winding wire coil 40 in its circumferential direction while filling the wedge-shaped space 48 across which the proximal portions of the two winding wire coils 30 and 40 form an acute angle. How the resin powder fills the wedge-shaped space 48 is shown by the front view in the three-view diagram of FIG. 2. The left-right side view of the three-view diagram of FIG. 2 shows how the resin powder is coated over the entire periphery of the one winding wire coil 30 in its circumferential direction and over the entire periphery of the other winding wire coil 40 in its circumferential direction.

Thus, by providing the insulation coating portion 50 so that the insulation coating portion 50 encloses the joint portion 22 over the entire peripheries of the two winding wire coils 30 and 40 in their circumferential directions while filling the wedge-shaped space 48 across which the proximal portions of the two winding wire coils 30 and 40 form an acute angle, a back side portion of the insulation coating portion 50 is physically and mechanically firmly secured around the two winding wire coils 30 and 40. This physical or mechanical securing force is added to the adhesion force between the two winding wire coils 30 and 40 at the distal end side of the insulation coating portion 50, so that the insulation coating portion 50 can be more certainly prevented from falling away from the joint portion 22 of the winding wire coils 30 and 40.

The size of the insulation coating portion 50 is determined by taking into consideration the specifications regarding the insulation characteristic of the rotary electric machine 10. For example, let's consider a case where the specified insulation characteristic of the rotary electric machine 10 is determined by an interval distance (distance) $L_0$ between a conductor portion where electric power enters and exits and the rotary electric machine case body 12. In this case, the size of the insulation coating portion 50 is set to such a size as to wholly enclose the joint portion 22 in the range of the interval distance $L_0$ from a surface 13 of an inner wall portion (inner wall) of the rotary electric machine case body 12.

When the rotary electric machine stator 17 is incorporated into the rotary electric machine case body 12, it is preferable that the insulation coating portion 50 not contact the rotary electric machine case body 12. If a margin space $\Delta L$ is appropriately provided between the insulation coating portion 50 and the surface 13 of the inner wall portion of the rotary electric machine case body 12, the length of the insulation coating portion 50 measured in the direction to the surface 13 of the inner wait portion of the rotary electric machine case body 12 is ($L_0 - \Delta L$).

In the example shown in FIG. 2, the weld ball 46, the one conducting wire 34 and the other conducting wire 44 are all contained in the length of the insulation coating portion 50, that is, the length ($L_0 - \Delta L$). As long as the length ($L_0 - \Delta L$) of the insulation coating portion is secured, the one conducting wire 34 or the other conducting wire 44 may be partially located outside the insulation coating portion 50, depending on circumstances and the like. For example, in the case where the adhesiveness of the resin powder of the resin coating portion 50 with the one conducting wire 34 and the other conducting wire 44 is better than the adhesiveness of the resin powder with the insulating covers 32 and 42, it is desirable to provide an increased contact area of the resin powder with the one conducting wire 34 and the other conducting wire 44 by removing large areas of the insulating covers 32 and 42.

In that sense, a main purpose of providing the insulation coating portion 50 is not to cover the exposed electrically conductive portions of the one conducting wire 34 and the other conducting wire 44 with an electrical insulator but to certainly insulate the conductor portions where electric power enters and exists and maintain the insulated state within the interval distance of $L_0$ from the rotary electric machine case body 12.

FIGS. 1 and 2 show a construction in which the joint portions 22 are disposed in the vicinity of the surface 13 of the outside-diameter-side inner wall portion of the rotary electric machine case body 12. Since the rotary electric machine case body 12 has a shape that extends along the outer peripheries of the components housed within the rotary electric machine case body 12, the joint portions 22 can be disposed, in some constructions, in the vicinity of the surface 13 of an inner wall portion of the rotary electric machine case body 12 which is other than the inner wall portion shown in FIGS. 1 and 2. Such constructions are shown in FIGS. 3 to 5.

Figure 3:
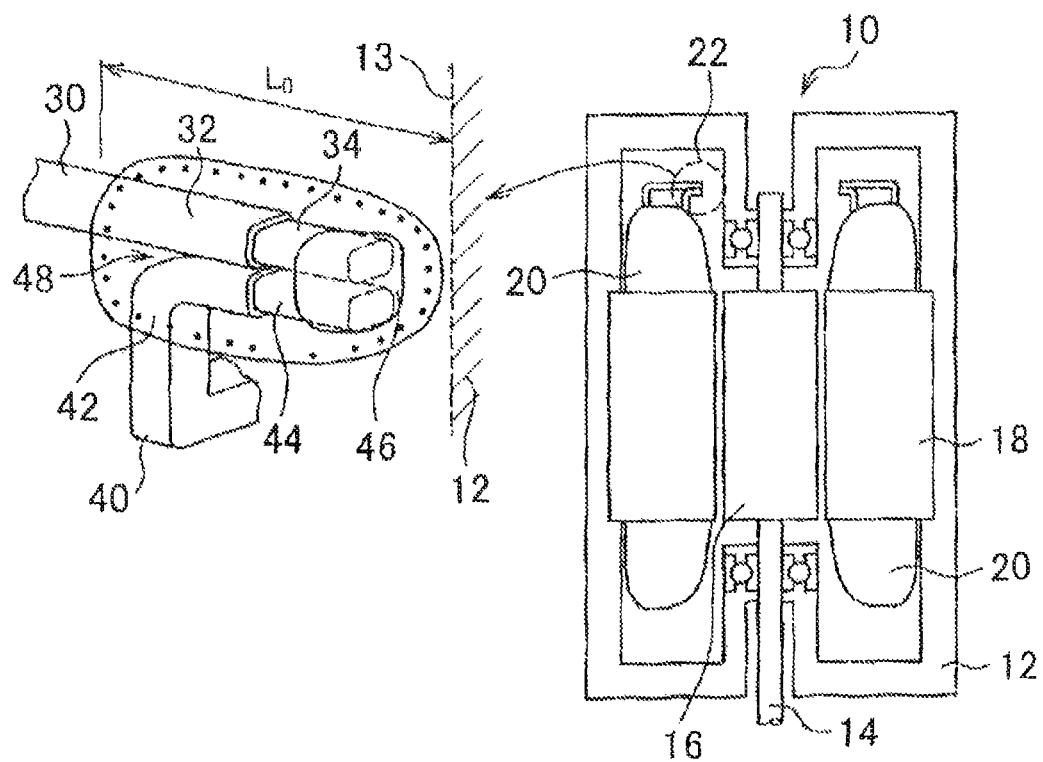
FIG. 3 is a diagram showing an example of a joint portion in an embodiment of the invention which is different from the joint portion shown in FIGS. 1 and 2.

FIG. 3 shows a construction in which the joint portions 22 are disposed in the vicinity of the surface 13 of an inside-diameter-side inner wall portion of the rotary electric machine case body 12. The construction shown in FIG. 3 is substantially the same as the construction shown in FIG. 1, except that the configuration of each joint portion 22 is reversed in the left-right direction from the configuration of each joint portion 22 shown in FIG. 1. That is, in this construction, too, each insulation coating portion 50 is formed by coating the joint portion 22 with resin powder so that the resin powder mass extends over the entire periphery of the one winding wire coil 30 in its circumferential direction and also over the entire periphery of the other winding wire coil 40 in its circumferential direction while filling the wedge-shaped space 48 across which proximal portions of the winding wire coils 30 and 40 in the joint portion 22 form an acute angle. Then, the size of each insulation coating portion 50 is set to such a size as to wholly enclose the joint portion 22 in the range of the interval distance $L_0$ from the surface 13 of the inner wall portion of the rotary electric machine case body 12.

Figure 4:
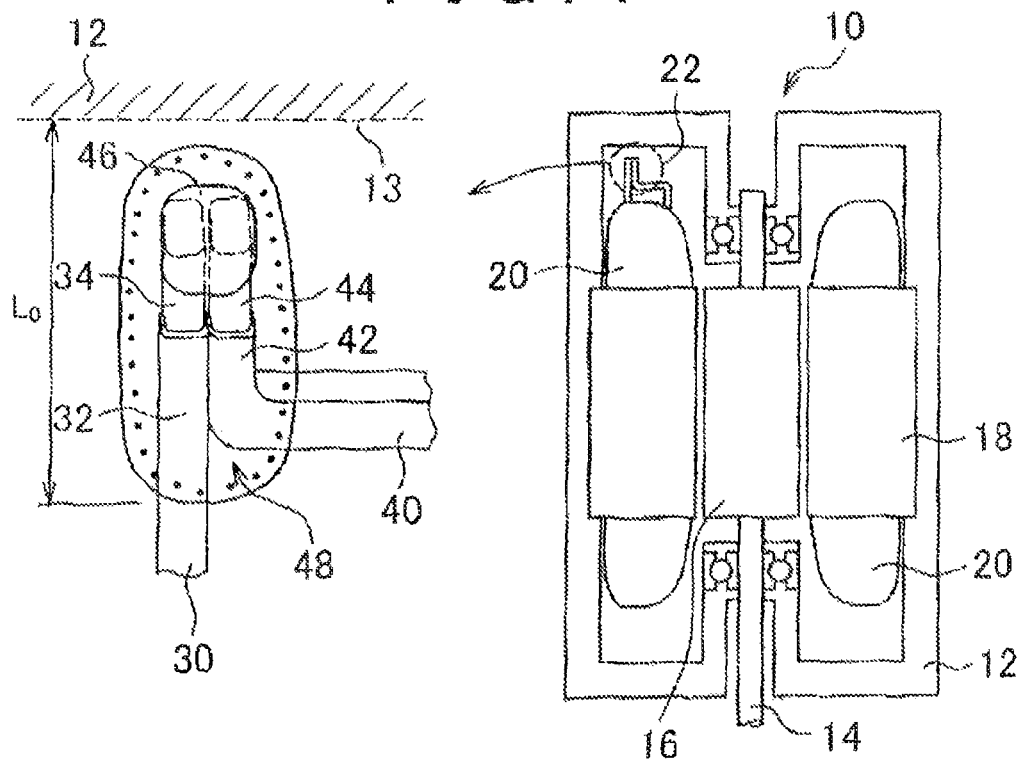
FIG. 4 is a diagram showing an example of a joint portion that is different from the joint portions shown in FIGS. 1 to 3.
Figure 5:
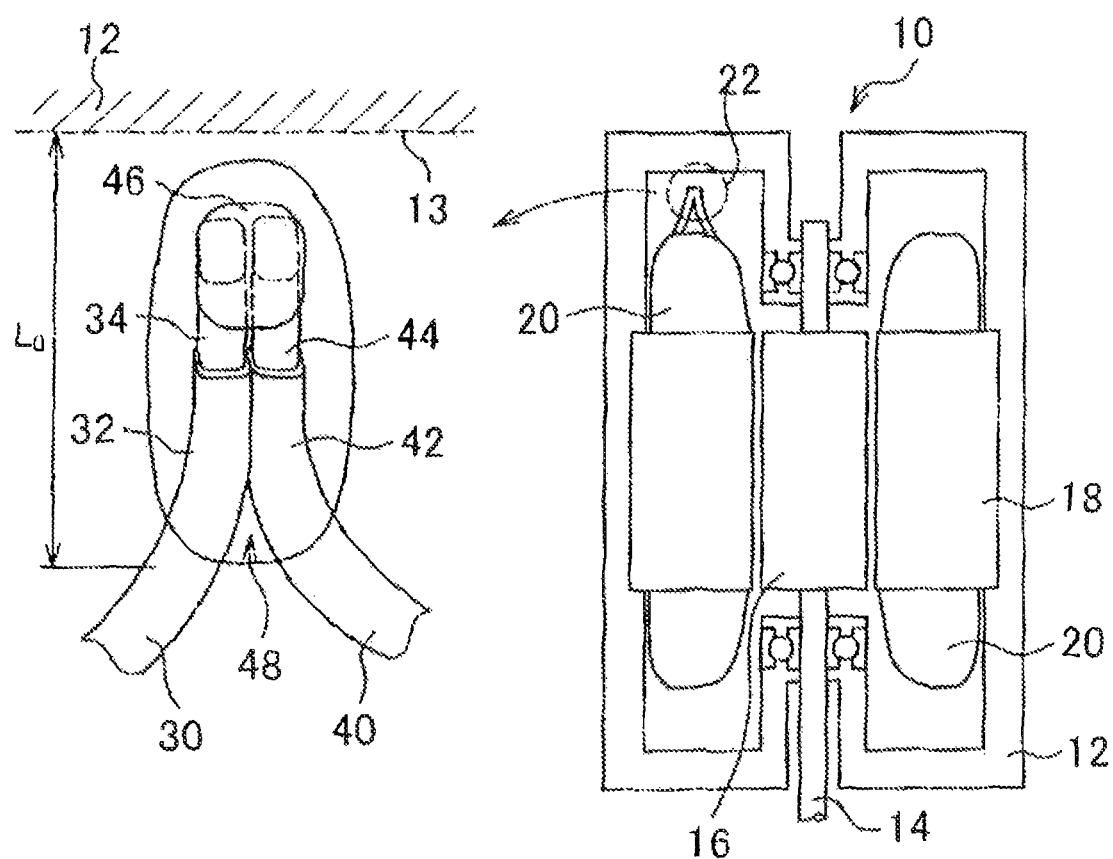
FIG. 5 is a diagram showing an example of a joint portion that is different from the joint portions shown in FIGS. 1 to 4.

FIGS. 4 and 5 show constructions in which the joint portions 22 are disposed in the vicinity of the surface 13 of an axially-distal-end-side inner wall portion of the rotary electric machine case body 12. In particular, the construction shown in FIG. 5 is different from the other construction examples in that the one winding wire coil 30 and the other winding wire coil 40 are both bent in the proximal side.

The constructions shown in FIGS. 4 and 5 are substantially the same as the constructions shown in FIGS. 1 and 3, except that the joint portions 22 extend in the axis direction instead of the radial directions. That is, in the constructions shown in FIGS. 4 and 5, too, each insulation coating portion 50 is formed by coating the joint portion 22 with resin powder so that the resin powder mass extends over the entire periphery of the one winding wire coil 30 in its circumferential direction and also over the entire periphery of the other winding wire coil 40 in its circumferential direction while filling the wedge-shaped space 48 across which proximal portion of the winding wire coils 30 and 40 in the joint portion 22 form an acute angle. Then, the size of each insulation coating portion 50 is set to such a size as to wholly enclose the joint portion 22 in the range of the interval distance $L_0$ from the surface 13 of the inner wall portion of the rotary electric machine case body 12.

The rotary electric machine stator of the invention can be used in rotary electric machines mounted in vehicles, or the like.

What is claimed is:

1. A stator for a rotary electric machine comprising:
a stator core fixed to a case of the rotary electric machine;
a plurality of winding wire coils including conducting wires and an insulating cover, the conducting wires being each covered with the insulating cover, the winding wire coils being wound on the stator core and forming a coil end protruded in an axial direction of the stator core, the winding wire coils including predetermined two winding wire coils, one winding wire coil of the two winding wire coils including a first conducting wire that is exposed by removing the insulating cover from a distal end portion of the one winding wire coil, and the other winding wire coil of the two winding wire coils including a second conducting wire that is exposed by removing the insulating cover from a distal end portion of the other winding wire coil;

a joint in which the first conducting wire and the second conducting wire are joined together at the coil end and in which a proximal portion of the one winding wire coil and a proximal portion of the other winding wire coil approach each other with an acute angle between the proximal portion of the one winding wire coil and the proximal portion of the other winding wire coil so that the first conducting wire and the second conducting wire lie on each other;

an insulating coat formed to enclose the joint with an insulating material, the insulating material being coated entirely over a periphery of the one winding wire coil in a circumferential direction of the one winding wire coil and entirely over a periphery of the other winding wire coil in a circumferential direction of the other winding wire coil while filling a space across which the proximal portions of the two winding wire coils in the joint form the acute angle, and wherein the insulating material is coated over both the insulating cover and the conducting wire of at least one of the proximal portion of the one winding wire coil and the proximal portion of the other winding wire coil, and wherein the proximal portion of the one winding wire coil and the proximal portion of the other winding wire coil define a wedge-shaped space between each other, and wherein the insulating material fills the wedge-shaped space, and wherein the first conducting wire and the second conducting wire are lapped together in the joint in a first direction, and at least one of the proximal portion of the one winding wire coil or the proximal portion of the other winding wire coil is bent in the first direction.

2. The stator according to claim 1, wherein
the insulating coat encloses wholly the joint in a range of a predetermined distance from a surface of an inner all of the case.

3. The stator according to claim 1, wherein
the insulating coat is formed by painting with a resin powder.

4. The stator according to claim 1, wherein
the proximal portion of the one winding wire coil of the two winding wire coils is adjacent to the distal end portion of the one winding wire coil, and the proximal portion of the other winding wire coil of the two winding wire coils is adjacent to the distal end portion of the other winding wire coil.

5. A rotary electric machine comprising:
the stator according to claim 1;
the case to which the stator is fixed; and
a rotor including a magnet.

6. The stator according to claim 1, wherein:
the proximal portion of at least one winding wire coil has a bend portion; and
the bend portion of the one winding wire coil and the proximal portion of the other winding wire coil define the acute angle.

7. The stator according to claim 1, wherein the insulating material is coated over both the insulating cover and the conducting wire of both the proximal portion of the one winding wire coil and the proximal portion of the other winding wire coil.

8. The stator according to claim 1, wherein only one of the proximal portion of the one winding wire coil or the proximal portion of the other winding we coil is bent in the first direction.

9. The stator according to claim 1, wherein the stator core extends in a first direction, and the distal ends of the one winding wire coil and the other winding wire coil extend in a second direction that is orthogonal to the first direction.

* * * * *